May 23, 1939.　　T. A. KAUPPI　　2,159,384
ETHYL CELLULOSE-NITROCELLULOSE COMPOSITION
Filed June 23, 1937
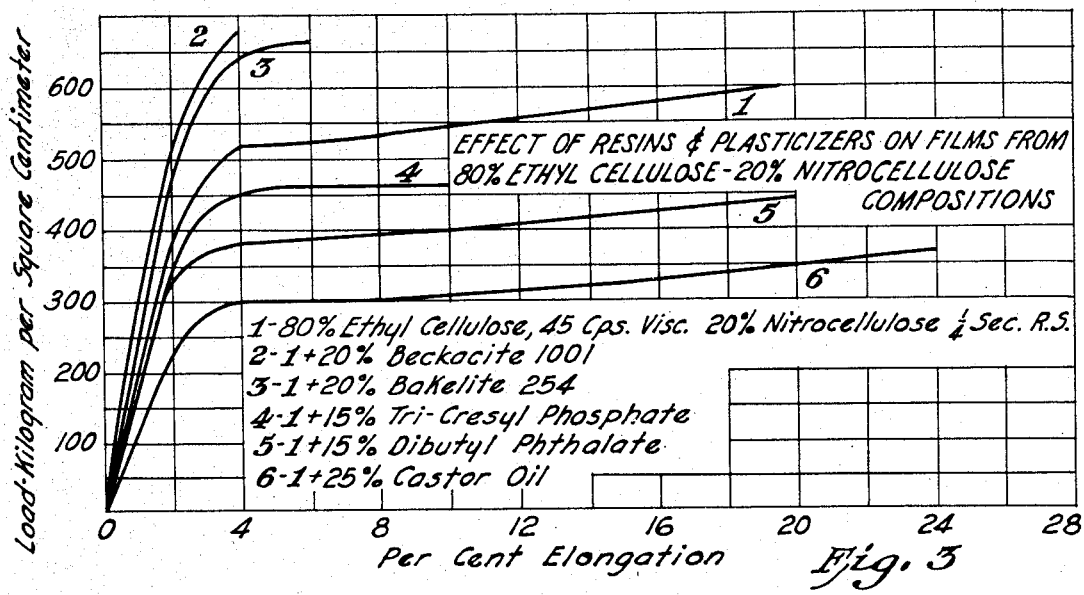
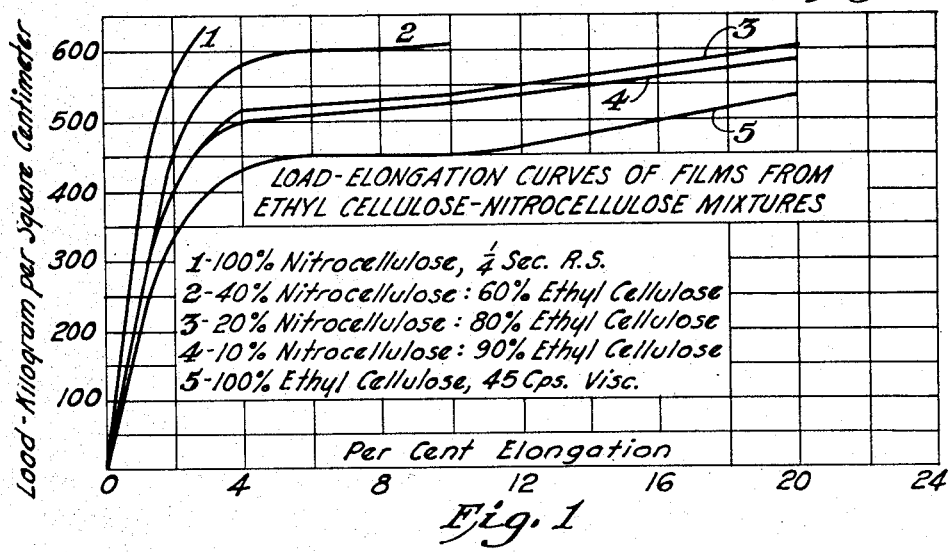
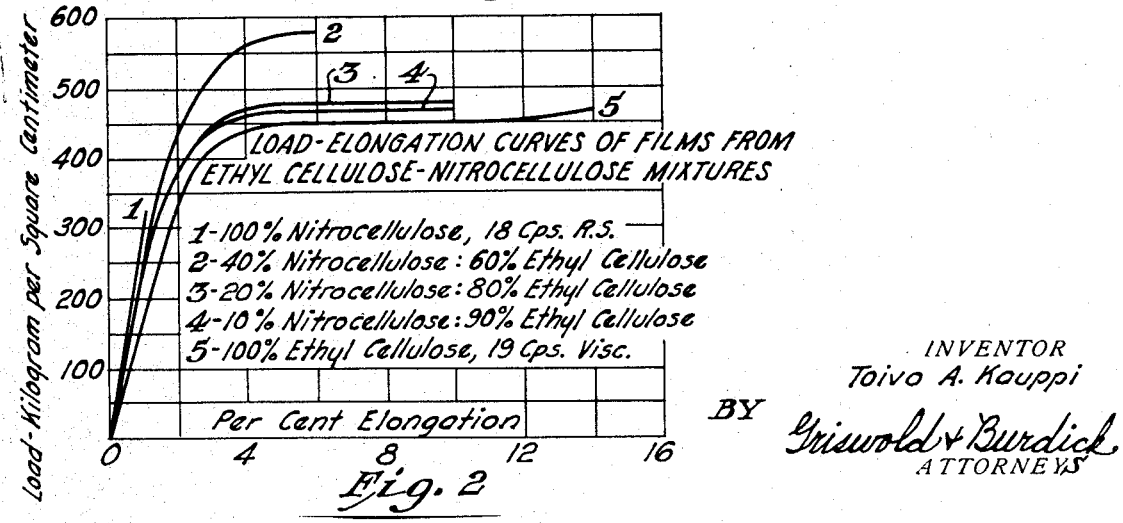
INVENTOR
Toivo A. Kauppi
BY Griswold + Burdick
ATTORNEYS Patented May 23, 1939

2,159,384

UNITED STATES PATENT OFFICE 2,159,384

ETHYL CELLULOSE-NITROCELLULOSE COMPOSITION

Toivo A. Kauppi, Midland, Mich., assignor to The Dow Chemical Company, Midland, Mich., a corporation of Michigan Application June 23, 1937, Serial No. 149,943

6 Claims. (Cl. 134—79)

This invention relates to coating compositions comprising low viscosity nitrocellulose and low viscosity ethyl cellulose.

In the preparation of coating compositions comprising cellulose derivatives, it is an object to produce solutions having as high a cellulose derivative content as possible, and concurrently maintain the viscosity of the solution in the range best adapted to the particular method by which it is intended to apply the coating composition. In the preparation of coating compositions adapted to use as spraying lacquers and the like, a relatively low viscosity solution is required, 75 centipoises being a commonly accepted standard for this purpose. Since the cellulose derivative contributes most of the viscosity in lacquers and coating "dopes", the trend has been toward cellulose derivatives of lower intrinsic viscosity. For example, in the nitrocellulose lacquer industry, the so-called "one-half second R. S." type of nitrocellulose has been widely employed. Recent improvements in the technique of reducing the viscosity of nitrocellulose have resulted successively in the introduction to the lacquer industry of "one-quarter second" nitrocellulose and finally "18 centipoise" nitrocellulose. Such products possess a lower intrinsic viscosity than those previously employed, and make possible the production of lacquers having a higher nitrocellulose content, while retaining approximately the same solution viscosity displayed by a higher viscosity-type of nitrocellulose. Films deposited from solutions of such low viscosity nitrocellulose are considerably more brittle and much less flexible than those obtainable from coating compositions comprising a higher viscosity-type of nitrocellulose. Similarly, the protective coatings deposited from solutions of low viscosity nitrocellulose lack toughness and durability.

Although some of the brittleness of nitrocellulose films may be overcome by adding plasticizers to the solutions from which such films are deposited, the increase in flexibility of the films is usually quite small, particularly in the case of coatings deposited from solutions of one-quarter-second and 18-centipoise types of nitrocellulose. Furthermore, the amount of plasticizers required to increase the flexibility and to decrease brittleness sufficiently to make an otherwise satisfactory coating film, produces films which are found to be too soft. Nitrocellulose films possess additional disadvantages in that they are highly flammable and are subject to discoloration due to the action of light.

It is accordingly among the objects of this invention to produce coating compositions containing low viscosity types of nitrocellulose from which films may be deposited which are flexible, tough, and yet of sufficient hardness to be satisfactory for use in lacquers. Another object is to provide a lacquer or coating composition comprising nitrocellulose which will possess a low viscosity, although having a high solid content, and which will deposit flexible, tough films having sufficient hardness for use in lacquers. A further object is to produce nitrocellulose films of reduced flammability, and increased stability to light. Still another object is the production of coatings or films of increased resin content, while retaining the flexibility desired for a given application of such coating compositions.

To the accomplishment of the foregoing and related ends, the invention then consists in the features hereinafter fully described and particularly pointed out in the claims, the annexed drawing and the following description setting forth in detail several approved combinations of ingredients embodying my invention, such disclosed compositions constituting, however, but several of various forms in which the principle of the invention may be used.

In the aforesaid annexed drawing:

Fig. 1 shows the load-elongation curves of films made from one-quarter-second nitrocellulose and 45-centipoise ethyl cellulose;

Fig. 2 shows the load-elongation curves of films made from 18-centipoise nitrocellulose and 19-centipoise ethyl cellulose; and Fig. 3 shows the load-elongation curves of films made from 20 parts of one-quarter-second nitrocellulose and 80 parts of 45-centipoise ethyl cellulose to which has been added various indicated amounts of certain resins and plasticizers.

I have now found that the above objects may be attained by adding a medium or low viscosity ethyl cellulose to a low viscosity type of nitrocellulose dissolved in a common solvent for the two types of cellulose derivatives.

In order to express the viscosities of nitrocellulose and of ethyl cellulose in terms of the same units, a series of viscosity measurements were made on one-half-second, one-quarter-second, and 18-centipoise types of nitrocellulose samples. Two different solvent mixtures were employed, designated in the following table as Solvents 1 and 2, respectively. Solvent 1 consisted of 55.0 parts of toluene, 25 parts of ethanol, and 20.0 parts of ethyl acetate, by weight,—a common nitrocellulose solvent. Solvent 2 consisted of 30 parts of toluene, 30 parts of ethanol, and 40 parts of butyl acetate, by volume.

Table

| Nitrocellulose type | Viscosity in centipoises | |
|---|---|---|
| | 12.2% solution in solvent 1 | 5% solution in solvent 2 |
| ¼ second | 105–140 | 8–10 |
| ½ second | 45–57 | 4–5 |
| 18 centipoises | 18–25 | 2.8–3.0 |

The ethyl cellulose employed in the tests to be described herein is characterized by the fact that the viscosity of a 5 per cent solution thereof in Solvent 2 is less than 75 centipoises and more than 10 centipoises.

Referring now to Fig. 1 of the drawing, it is observed that a film made entirely of one-quarter-second R. S. nitrocellulose has an ultimate tensile strength of approximately 640 kilograms per square centimeter of original cross section and is capable of elongation only to the extent of about 3 per cent. A film comprising 40 per cent nitrocellulose of the aforesaid one-quarter-second type and 60 per cent of 45-centipoise ethyl cellulose has a tensile strength of 610 and an elongation of 9 per cent. A mixture of 20 parts nitrocellulose and 80 parts ethyl cellulose has a tensile strength of 600 and an elongation of 20 per cent. The tensile strength of pure 45-centipoise ethyl cellulose is about 530 kilograms per square centimeter of original cross section and the elongation is about 20 per cent. From these results it is seen that the most marked improvement in the properties of a nitrocellulose film produced from one-quarter-second nitrocellulose is obtained by mixing the nitrocellulose with 4 times its weight of a 45-centipoise type ethyl cellulose.

A similar result is noticed in Fig. 2, wherein are plotted the load-elongation curves of 18-centipoise R. S. nitrocellulose and mixtures thereof with 19-centipoise ethyl cellulose. It was found that the pure 18-centipoise nitrocellulose was so weak and brittle that it can be tested only with difficulty. The addition of sufficient ethyl cellulose to provide a composition containing 60 per cent ethyl cellulose and 40 per cent nitrocellulose forms a film of high flexibility corresponding in many of its properties to those of a 6-second nitrocellulose type. It is seen, however, that for mixtures of nitrocellulose and ethyl cellulose of the types considered in Fig. 2, maximum elongation of films is obtained from a mixture containing 20 parts nitrocellulose and 80 parts ethyl cellulose.

Fig. 3 shows load-elongation curves of films containing 80 per cent ethyl cellulose of 45-centipoise viscosity and 20 per cent nitrocellulose of one-quarter-second R. S. type, to which have been added the indicated amounts of certain commercially available plasticizers and resins. Curve 1 of Fig. 3 and curve 3 of Fig. 1 refer to the same composition. It is seen that a slightly increased degree of elongation is attainable by adding 25 per cent of castor oil to the ethyl cellulose-nitrocellulose composition. This is accompanied, however, by a material decrease in the ultimate tensile strength of the cellulose composition film. If tensile strength is more important than elongation, for a particular application, it is seen that the addition of certain synthetic resins, such as those known commercially as "Beckacite 1001" and "Bakelite 254", both of which are phenol-aldehyde type condensation products, produces a cellulose derivative composition having markedly increased tensile strength.

The breaks from the rising portions to the horizontal portions of the curves in Figs. 1, 2, and 3 represent the yield-points of the particular plastic compositions shown. The facts that ethyl cellulose is an excellent plasticizer for nitrocellulose and that nitrocellulose is a good hardening agent for ethyl cellulose are apparent from the load-elongation and yield-points shown on the curves, in view of my finding, published jointly with S. L. Bass, that the yield-point of a cellulose derivative film varies directly with the hardness of such film ("Industrial and Engineering Chemistry", June, 1937, page 678). Ethyl cellulose plasticizes nitrocellulose in a manner different from the plasticizing action of most chemical plasticizers, in that it contributes its own flexibility to the composition but does not materially decrease the hardness thereof.

Ethyl cellulose and nitrocellulose behave as one in any given mixture. This is seen from Fig. 3, in which an 80–20 ethyl cellulose-nitrocellulose mixture was cast into films with added resins and plasticizers. Because of the inherent greater hardness of the mixture, all its compositions with resins and plasticizers were harder than the ethyl cellulose alone. Similarly, because of the inherent flexibility of the mixture, all of the resin and plasticizer compositions were more flexible and were tougher than those of nitrocellulose alone. It may be added parenthetically that less plasticizer is required for a nitrocellulose-ethyl cellulose composition than for nitrocellulose alone.

Since one of the principal applications of an ethyl cellulose-nitrocellulose composition is as a lacquer or coating composition, a series of studies was made to determine the amount of such mixture which could be incorporated in a ternary solvent mixture comprising 40 parts of butyl acetate, 30 parts of toluene, and 30 parts of ethanol, by volume, to produce a solution having a viscosity of approximately 75 centipoises, i. e., one which could readily be applied as a spraying lacquer. The type of ethyl cellulose and of nitrocellulose employed in each series of determinations is indicated at the head of the corresponding table. It is noticed that, when the amount of ethyl cellulose in a coating composition decreases and the amount of nitrocellulose correspondingly increases, there is a gradual increase in the amount of cellulose derivatives which can be dissolved in the aforesaid ternary solvent mixture before producing a 75-centipoise solution.

*Blend I.—19-centipoise ethyl cellulose—18-centipoise nitrocellulose*

| Per cent ethyl cellulose in the blend | Viscosity of a 5% solution | Concentration to give solution of 75-centipoise viscosity, per cent |
|---|---|---|
| 100 | 18 | 8.5 |
| 80 | 13 | 9.0 |
| 60 | 9 | 10.5 |
| 40 | 6 | 12.5 |
| 20 | 4 | 14.5 |
| 0 | 2.8 | 16.5 |

*Blend II.—44-centipoise ethyl cellulose—¼-second nitrocellulose*

| Per cent ethyl cellulose in the blend | Viscosity of a 5% solution | Concentration to give solution of 75-centipoise viscosity, per cent |
|---|---|---|
| 100 | 38 | 6.5 |
| 80 | 26 | 7.5 |
| 60 | 17.5 | 8.5 |
| 40 | 11.5 | 10.0 |
| 20 | 7.4 | 11.5 |
| 0 | 4.5 | 13.8 |

*Blend III.—20-centipoise ethyl cellulose—½-second nitrocellulose*

| | | |
|---|---|---|
| 100 | 19 | 7.0 |
| 80 | 17 | 7.5 |
| 60 | 15 | 8.0 |
| 40 | 12.6 | 8.5 |
| 20 | 10.6 | 9.0 |
| 0 | 9 | 9.5 |

*Blend IV.—15-centipoise ethyl cellulose—½-second nitrocellulose*

| | | |
|---|---|---|
| 100 | 15 | 8.0 |
| 80 | 13.5 | 8.5 |
| 60 | 12.4 | 8.8 |
| 40 | 11 | 9.0 |
| 20 | 10 | 9.3 |
| 0 | 9 | 9.5 |

As pointed out in my co-pending application Serial Number 149,942, filed even date herewith, a ternary mixture of 40 parts of butyl acetate, 30 parts of toluene, and 30 parts of ethanol, or the equivalent of such a mixture as defined in the aforesaid co-pending application, is a solvent from which ethyl cellulose films can be deposited having the maximum tensile strength and elongation from any mixture of butyl acetate, toluene, and ethanol. Similarly, for any given concentration of ethyl cellulose in a ternary mixture of butyl acetate, toluene, and ethanol, this particular solvent composition yields solutions of minimum viscosity. The same is true in a general way for solutions of mixtures of ethyl cellulose and nitrocellulose, and for the films deposited from such solutions.

Dyes or pigments may be readily incorporated in the hereindescribed nitrocellulose-ethyl cellulose compositions, to give colored products.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:

1. A composition of matter comprising between about 40 and 20 parts of nitrocellulose, a 5 per cent solution of which in a mixture of 40 parts butyl acetate, 30 parts toluene, and 30 parts ethanol, by volume, has a viscosity between about 2.5 and about 10 centipoises, and between about 60 and about 80 parts of ethyl cellulose, a 5 per cent solution of which in the same solvent mixture has a viscosity between about 10 and about 75 centipoises, the said composition when in film form being characterized by having a tensile strength at least as great as that of the ethyl cellulose and being capable of elongation to the extent of at least three times that of the nitrocellulose.

2. A composition of matter comprising between about 40 and about 20 parts of nitrocellulose, a 5 per cent solution of which in a mixture of 40 parts butyl acetate, 30 parts toluene, and 30 parts ethanol, by volume, has a viscosity between about 2.5 and about 10 centipoises, and between about 60 and about 80 parts of ethyl cellulose, a 5 per cent solution of which in the same solvent mixture has a viscosity between about 10 and about 75 centipoises, in a common solvent for the two aforesaid cellulose derivatives, wherefrom may be deposited films of the mixed cellulose derivatives capable of at least three times as great an elongation under tension as the nitrocellulose alone and having a tensile strength at least as great as the ethyl cellulose alone.

3. A composition of matter comprising between about 40 and about 20 parts of nitrocellulose, a 5 per cent solution of which in a mixture of 40 parts butyl acetate, 30 parts toluene, and 30 parts ethanol, by volume, has a viscosity between about 2.5 and about 10 centipoises; between about 60 and about 80 parts of ethyl cellulose, a 5 per cent solution of which in the same solvent mixture has a viscosity between about 10 and about 75 centipoises; and a resin, the said composition when in film form being characterized by having a tensile strength substantially greater than that of the said composition without a resin and substantially greater than either the nitrocellulose or the ethyl cellulose alone.

4. A composition of matter comprising between about 40 and about 20 parts of nitrocellulose, a 5 per cent solution of which in a mixture of 40 parts butyl acetate, 30 parts toluene, and 30 parts ethanol, by volume, has a viscosity between about 2.5 and about 10 centipoises; between about 60 and about 80 parts of ethyl cellulose, a 5 per cent solution of which in the same solvent mixture has a viscosity between about 10 and about 75 centipoises; a plasticizer; and a resin, all dissolved in a common solvent for the two aforesaid cellulose derivatives, wherefrom may be deposited films of the mixed cellulose derivatives capable of at least three times as great an elongation under tension as the nitrocellulose alone and having a tensile strength at least as great as the ethyl cellulose alone.

5. A composition of matter comprising between about 40 and about 20 parts of nitro-cellulose, a 5% solution of which in a mixture of 40 parts butyl acetate, 30 parts toluene and 30 parts ethanol, by volume, has a viscosity between 4 and 5 centipoises, and between about 60 and about 80 parts of ethyl cellulose, a 5 solution of which in the same solvent mixture has a viscosity of about 45 centipoises, the said composition when in film form being characterized by having a tensile strength at least as great as that of the ethyl cellulose and being capable of elongation to the extent of at least three times that of the nitrocellulose.

6. A composition of matter comprising between about 40 and about 20 parts of nitro-cellulose, a 5% solution of which in a mixture of 40 parts of butyl acetate, 30 parts toluene and 30 parts ethanol, by volume, has a viscosity between 2.8 and 3.0 centipoises, and between about 60 and about 80 parts of ethyl cellulose, a 5% solution of which in the same solvent mixture has a viscosity of about 20 centipoises, the said composition when in film form being characterized by having a tensile strength at least as great as that of the ethyl cellulose and being capable of elongation to the extent of at least three times that of the nitro-cellulose.

TOIVO A. KAUPPI.